(12) United States Patent
Easter (10) Patent No.: US 6,698,730 B2
(45) Date of Patent: Mar. 2, 2004

(54) DUAL RATE AIR SPRING

(75) Inventor: Mark R. Easter, Indianapolis, IN (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 09/971,974

(22) Filed: Oct. 4, 2001

(65) Prior Publication Data

US 2003/0067103 A1 Apr. 10, 2003

(51) Int. Cl.[7] .............................. F16F 9/43; F16F 9/342; B60G 9/04
(52) U.S. Cl. ................. 267/64.28; 267/64.22; 267/140.15; 280/124.157
(58) Field of Search ......................... 267/64.27, 64.28, 267/64.15, 64.11, 64.22, 64.23, 122, 195, 140.14, 140.15; 188/322.13, 319.1; 280/124.108, 124.158, 124.157

(56) References Cited

U.S. PATENT DOCUMENTS

| | | | | |
|---|---|---|---|---|
| 3,246,905 A | * | 4/1966 | Morgan | 280/6.159 |
| 3,790,147 A | * | 2/1974 | Owen | 267/64.21 |
| 4,105,216 A | * | 8/1978 | Graham et al. | 280/6.158 |
| 4,325,541 A | * | 4/1982 | Korosladanyi et al. | 267/220 |
| 4,398,704 A | * | 8/1983 | Buchanan et al. | 267/64.21 |
| 4,506,751 A | * | 3/1985 | Stephens | 180/89.15 |
| 4,592,540 A | | 6/1986 | Yokoya et al. | |
| 4,598,929 A | | 7/1986 | Kumagai et al. | |
| 4,666,135 A | | 5/1987 | Buma et al. | |
| 4,669,710 A | * | 6/1987 | Horvat | 267/64.21 |
| 4,697,796 A | | 10/1987 | Kitamura et al. | |
| 4,718,650 A | | 1/1988 | Geno | |
| 4,735,401 A | | 4/1988 | Buma et al. | |
| 4,743,000 A | | 5/1988 | Karnopp | |
| 4,787,607 A | | 11/1988 | Geno et al. | |
| 4,844,428 A | | 7/1989 | Margolis et al. | |
| 4,946,144 A | | 8/1990 | Geno et al. | |
| 5,111,735 A | | 5/1992 | Johnson | |
| 5,282,412 A | * | 2/1994 | Ebbing | 92/240 |
| 5,333,645 A | | 8/1994 | Galazin | |
| 5,342,139 A | * | 8/1994 | Hoffman | 403/327 |
| 5,413,316 A | | 5/1995 | Easter | |
| 5,445,447 A | * | 8/1995 | Farr et al. | 303/117.1 |
| 5,860,450 A | * | 1/1999 | Trudeau et al. | 137/627.5 |
| 6,513,798 B2 | * | 2/2003 | Capek et al. | 267/64.27 |

FOREIGN PATENT DOCUMENTS

| | | |
|---|---|---|
| DE | 40 18712 A1 | 12/1991 |
| JP | 58199209 A * | 11/1983 |
| JP | 61135808 A * | 6/1986 |

* cited by examiner

Primary Examiner—Jack Lavinder
Assistant Examiner—Melody M. Burch
(74) Attorney, Agent, or Firm—Michael Sand; Michael R. Huber (57) ABSTRACT

An air spring has a pair of spaced end members with a flexible sleeve ending therebetween forming an intervening air chamber. A partition is mounted in a hollow interior of one of the end members and forms an auxiliary air reservoir in the end member. A control valve having a moveable plunger is mounted on the one end member and is connected to a source of pressurized air. The plunger extends between the main air chamber and auxiliary reservoir and is controlled by a solenoid for selectively providing air passages between the pressurized air and the main air chamber and between the main air chamber and auxiliary reservoir to change the volume of the main air chamber to change the spring rate of the air spring.

24 Claims, 14 Drawing Sheets

DUAL RATE AIR SPRING

BACKGROUND OF THE INVENTION

1. Technical Field

The invention relates to suspension systems, and in particular to an air suspension system used for vehicles. More particularly, the invention relates to an air spring having an auxiliary reservoir formed in one of the end members of the air spring which communicates with the main air chamber of the air spring to enable the spring rate to be varied by providing communication between the main air chamber and auxiliary reservoir.

2. Background Information

Air springs have been used for a considerable number of years for various applications including use in vehicles for suppressing road shock imparted onto the wheels of a vehicle upon the wheel encountering a projection or depression in the roadway.

Each air spring will have a specific spring rate depending upon the design of the air spring components and its size which will provide various ride characteristics for the vehicle in which the air spring is mounted. One of the factors which determines the spring rate is the volume of the air contained within the flexible sleeve or bellows of the air spring which forms the main air chamber. Varying the volume of air in the flexible sleeve of the air spring enables various spring rates to be achieved. This can be accomplished by various means such as by supplying or removing air into or from the air spring by various control valves, and by the use auxiliary air reservoirs which are fluidly connected to the main air spring chamber. When a vehicle wheel encounters a depression or projection in the roadway, air will be introduced into or removed from the air spring by means of an auxiliary reservoir to change the volume of air, thereby changing the spring rate in order to provide the desired ride characteristics for the vehicle. The smaller the volume of the air chamber, the firmer will be the ride provided thereby.

Heretofore auxiliary reservoirs for air springs usually consisted of a remotely mounted reservoir which was connected by a hose or other fluid communication line to the air chamber of the air spring. Some examples of such prior art air springs containing auxiliary reservoirs are shown in U.S. Pat. Nos. 2,115,072, 3,039,761, 4,159,105, 4,592,540, 4,743,000, 5,169,129, and 5,413,316.

Other air springs use a dual chamber type of arrangement in which an auxiliary reservoir is formed in the air spring and communicates with the air spring through various controlled openings. Examples of these prior art dual chamber air springs are shown in the following patents.

U.S. Pat. No. 4,592,540 discloses a combination air spring/damper in which an actuator has two functions, one to adjust the shock absorber and one to open the path to the second chamber. However, there is no mechanism for regulating air into the main air spring. It also requires additional complicated mechanisms and openings and is in two separate chambers, not one contained within another as in the present invention. Likewise, the two chambers are welded together in a complicated arrangement and could give rise to leakage of air to the outside of the air chamber whereas in the present invention any leaks in the auxiliary chamber will leak into the main chamber and has little effect on the operation of the invention.

U.S. Pat. No. 4,598,929 shows a combination air spring/hydraulic damper in which the auxiliary air spring is mounted above the main air spring and its fluid communication therewith is controlled by a piston rod and a control rod contained in the piston rod of the hydraulic damper. One actuator operates the spring with two separate chambers and it uses one control rod for both the air spring and shock absorber and it is concerned with the ability to change the spring constant and damping in motion to control the ride of the vehicle.

U.S. Pat. No. 4,666,135 discloses an air suspension system having an air spring/damper combination, an auxiliary reservoir, and a control valve which is rotated by a motor and gear combination for providing selective communication between the auxiliary air chamber and main air chamber of the air spring. It does not use a controlled plunger for regulating the flow of outside air into and out of the air spring as in the present invention.

U.S. Pat. No. 4,697,796 discloses an air spring/hydraulic damper combination in which the air spring has two chambers and uses an electric motor for rotating a shaft to provide communication between the pair of air chambers to change the effective volume thereof.

U.S. Pat. No. 4,735,401 discloses a shock absorber having a plurality of air chambers which are connected and disconnected with each other by a rotary valve which is controlled by an actuator mounted on top of the air spring. However, the control does not regulate air into the air spring assembly as does the present invention nor does it use a plunger mechanism of a solenoid for assisting in retaining a partition plate to form the auxiliary reservoir.

U.S. Pat. No. 4,844,428 shows another air spring having a main and auxiliary air chamber which are in fluid communication with each other by use of an electric motor and a piston for controlling the fluid opening between the various air chambers. The piston/motor does not open or close a chamber as in the present invention and it adjusts volume in the always open chamber. it also requires a more elaborate linear positioning motor, motor controller, screw drive, and bearing to operate and does not indicate how the air is regulated into and out of the air spring.

However, none of these prior art suspension systems which utilize two or more air chambers for effecting the air spring rate, provide for connecting the air spring to a remote source of pressurized air, such as the compressor found in many vehicles utilizing the air spring and which utilizes the plunger of a control valve for securing a partition plate within the end member of the air spring to form the auxiliary reservoir.

BRIEF SUMMARY OF THE INVENTION

The present invention provides an air spring for vehicle suspension systems having a main air chamber formed by a flexible bellows and an auxiliary air chamber formed in one of the end members thereof which is in selective fluid communication with the main air chamber to change the effective volume for changing the air spring rate.

The air spring of the invention uses a partition plate mounted in the interior of a usual end cap to form the auxiliary chamber, which plate is retained in the end cap by a plunger mechanism of a solenoid valve which is connected to a remote source of pressurized air wherein the plunger can be rotatable or linearly moveable for selectively providing communication between the auxiliary air reservoir and main air chamber or for supplying fluid communication between the supply of compressed air and the main air chamber.

Another aspect of the invention is forming the end cap of high strength glass reinforced material with the partition plate being snap-fitted therein and retained by the control valve.

A further feature of the invention is to provide a solenoid with two separate independently moveable plungers and actuation coils for controlling the flow of air between the auxiliary reservoir and the main air chamber and between the main air chamber and the remote source of pressurized air.

Still another aspect of the invention is to provide the end cap with a plurality of auxiliary air chambers which are fluidly connected with each other or with the main air chamber through a solenoid controlled plunger, wherein partitions are mounted in the end cap by snap-fit engagements with a housing of the plunger, thus enabling the partitions to be formed of various materials with the solenoid assisting in locking the partitions in position within the end cap.

Another feature of the invention is enabling the auxiliary air chamber to be formed within a usual end cap without extensive modifications thereto and without affecting the overall height and dimensions of the air spring, thereby enabling the dual rate characteristics to be achieved without extensive modifications and expense.

The dual rate air spring of the present invention also enables the air spring to operate in its usual manner wherein air is introduced into and out of the main air chamber of the flexible bellows from a remote source of air without use of the auxiliary reservoir until the same is required, at which time a selective movement of the solenoid plunger will provide the desired communication between the two air chambers and/or stop the flow of air from the remote source.

The foregoing advantages, construction, and operation of the present invention will become more readily apparent from the following description and accompanying drawings.

BRIEF DESCRIPTION OF THE DRAWINGS

Similar numerals refer to similar parts throughout the drawings.

DETAILED DESCRIPTION OF THE INVENTION

A first embodiment of the improved air spring of the present invention is indicated generally at 1, and is shown particularly in FIGS. 1–5B. Air spring 1 is shown connected to a supply of compressed air 2, such as a compressor, or to other types of fluid by a supply line 3. Air spring 1 is the type which is adapted to be mounted between spaced structural components of a vehicle indicated at 4 and 5, or between separately movable components of other types of equipment. The air spring, when used with a vehicle, absorbs road shock imparted on the vehicle tires, upon the tires encountering a depression or projection in the roadway.

Figure 1:
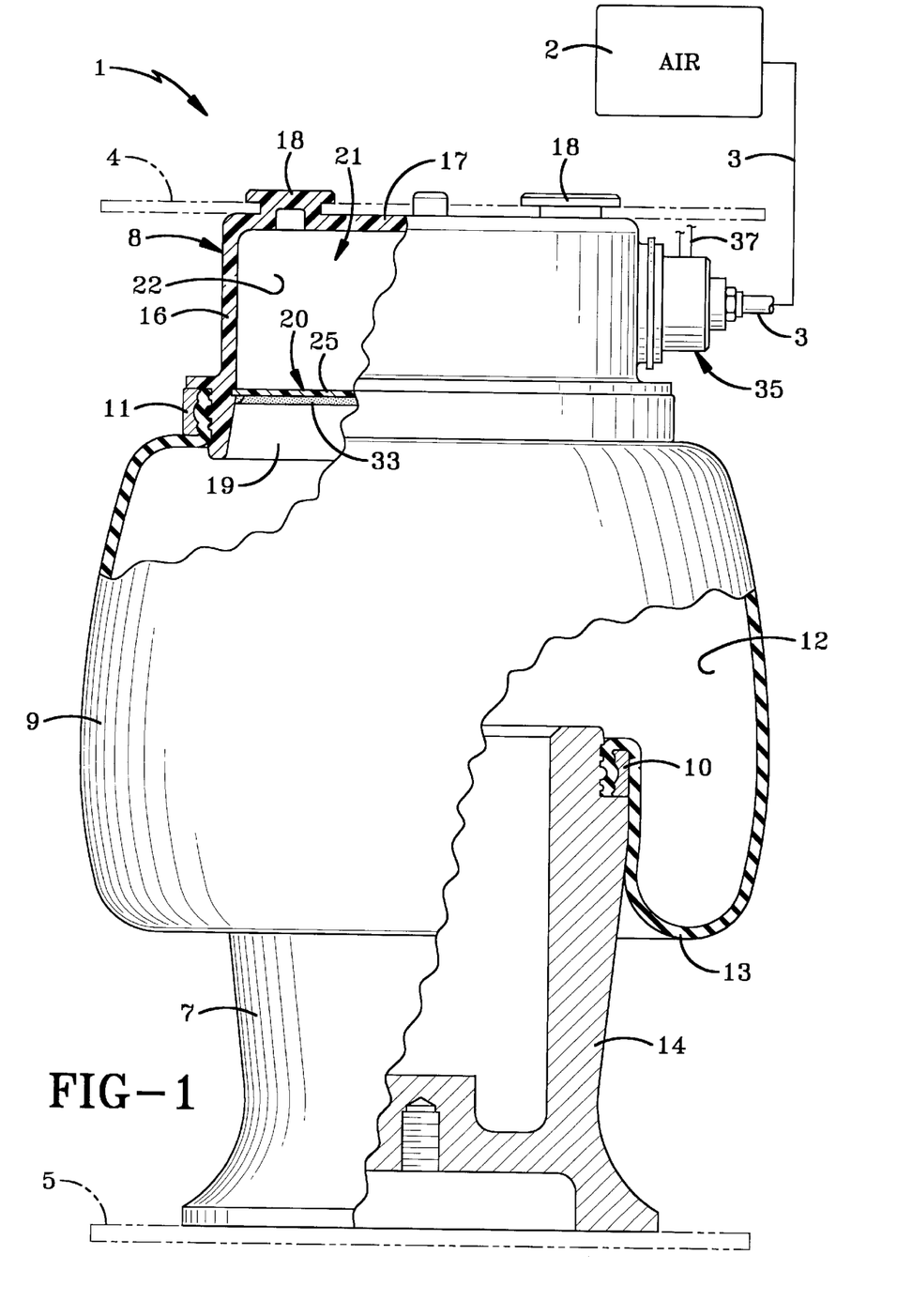
FIG. 1 is an elevational view with portions broken away and in section showing the improved dual rate air spring.
Figure 2:
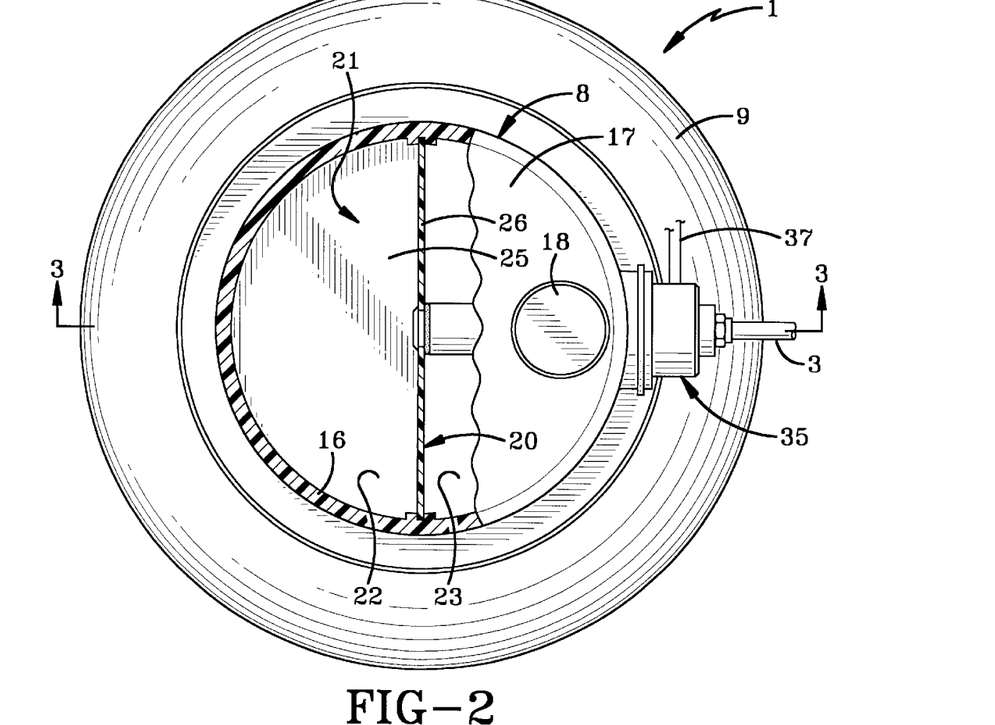
FIG. 2 is a top plan view of the air spring shown in FIG. 1 with portions of the top wall of the end cap broken away.

Air spring 1 includes a pair of spaced end members, one of which is a piston 7 and the other is an end cap indicated generally at 8. A flexible elastomeric sleeve 9 is sealingly connected by sealing bands or crimp rings 10 and 11 to piston 7 and end cap 8 respectively. Sleeve 9 forms an internal main air chamber 12. Sleeve 9 has a generally cylindrical configuration of the type used for many air springs and is formed of an elastomeric material usually containing internal reinforcing chords (not shown), which are trapped within one or two plies of elastomeric material. Preferably, one end of sleeve 9 is formed with a rolling lobe 13 which rolls along an annular wall 14 of piston 7 when the end members move axially with respect to each other. End cap 8 is of a usual annular construction having a cylindrical side wall 16 and a disc-shaped top wall 17 which may have several projections 18 formed integrally therewith for securing end cap 8 to support structure 4. End cap 8 has an open bottom 19 providing communication between its hollow interior 21 and main air chamber 12.

Figure 3:
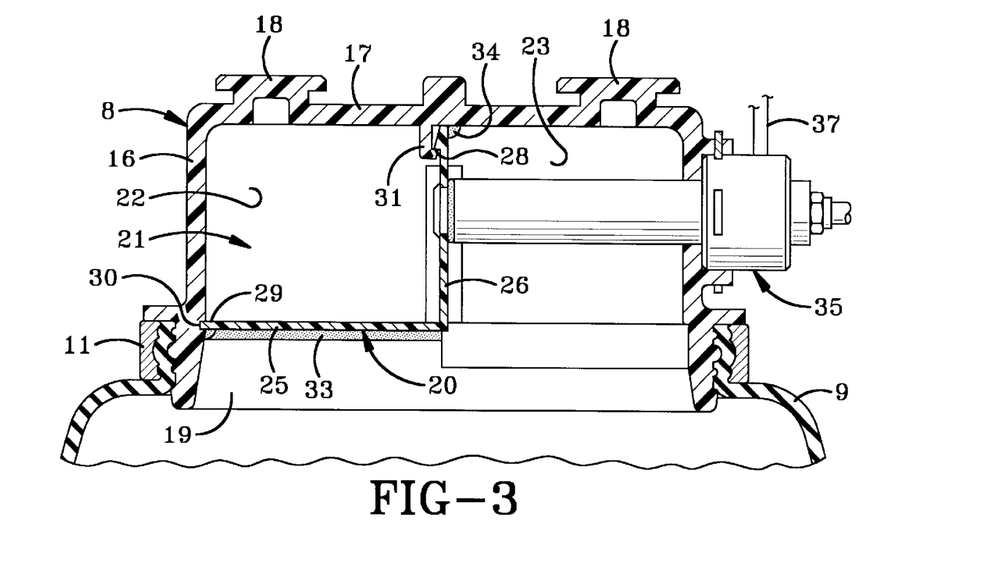
FIG. 3 is a sectional view taken on line 3—3, FIG. 2.
Figure 4:
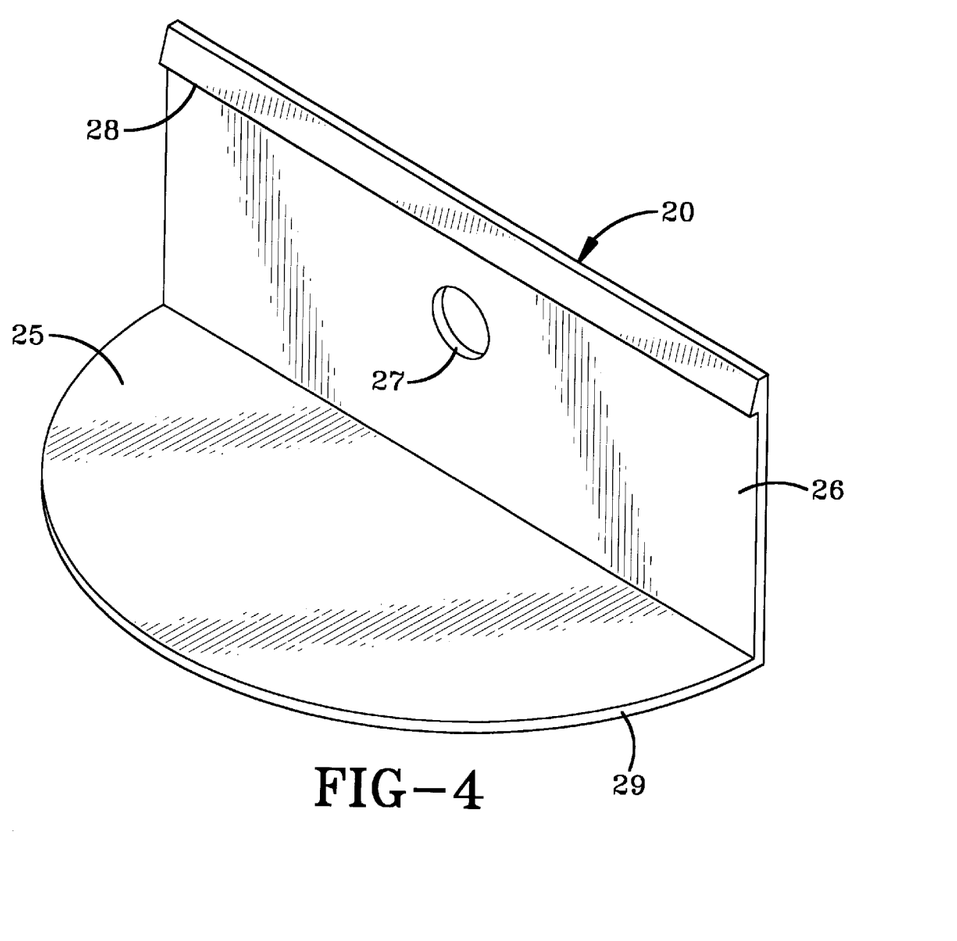
FIG. 4 is an enlarged perspective view of the partition which forms the auxiliary air reservoir removed from in the end cap of the air spring.
Figure 5:
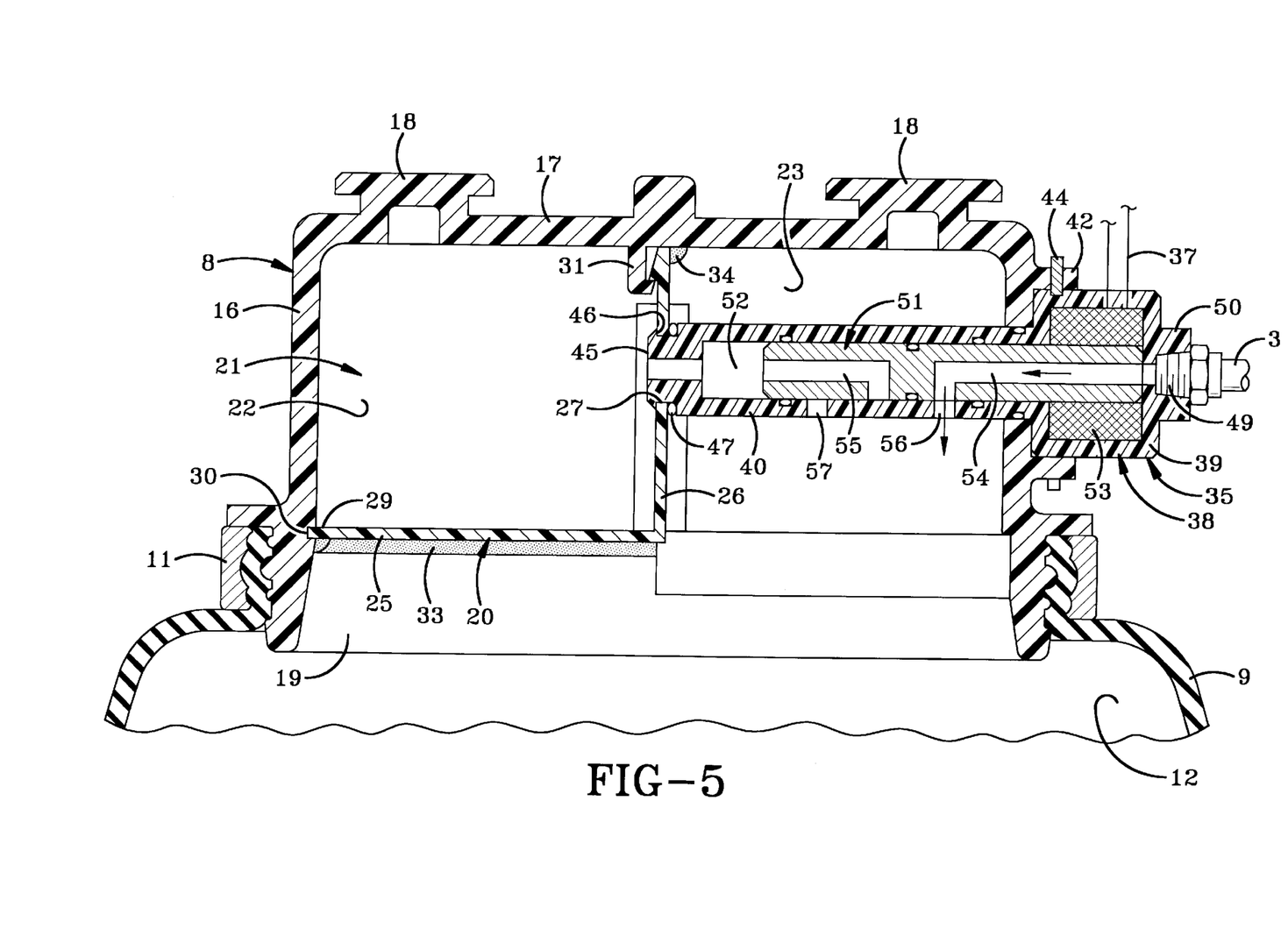
FIG. 5 is an enlarged sectional view similar to FIG. 3 with a linearly movable plunger in a first open position providing communication between a remote source of pressurized air and the main air chamber of the air spring.

In accordance with the invention, a partition indicated generally at 20 (FIG. 4), is mounted within hollow interior 21 of end cap 8 dividing the hollow interior into a auxiliary reservoir 22 and a secondary air chamber 23 (FIGS. 3 and 5). Partition 20 preferably includes a semicircular bottom wall 25 and an upstanding division wall 26. Division wall 26 is formed with an opening 27 and an undercut edge 28. Partition 20 may be mounted in various ways within end cap 8. One type of mounting is shown in FIGS. 3 and 5 wherein outer curved edge 29 of bottom wall 25 is received within a notch 30 formed in a semicircular portion of end cap wall 16.

Undercut edge 28 forms a snap-fit engagement with a complimentary shaped rib 31 extending downwardly from the interior surface of top wall 17. A bead of flexible sealing material 33 preferably extends along the junction of edge 29 and groove 30 to provide an airtight seal therebetween. A similar bead of sealing material 34 may extend between the upper end of partition wall 26 and the underside surface of end wall 17.

Figure 5A:
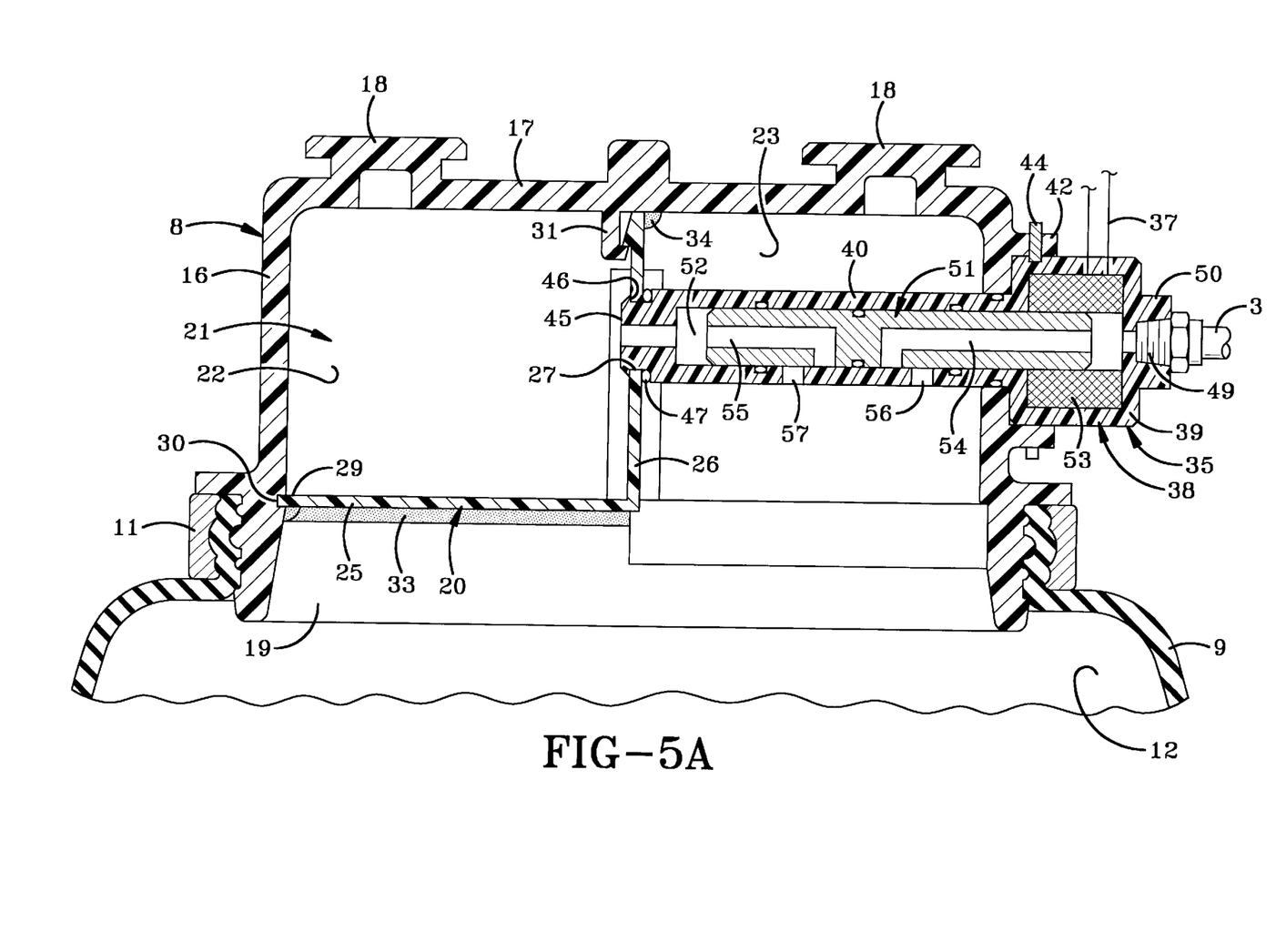
FIG. 5A is a view similar to FIG. 5 showing the linearly movable plunger in a fully closed position.
Figure 5B:
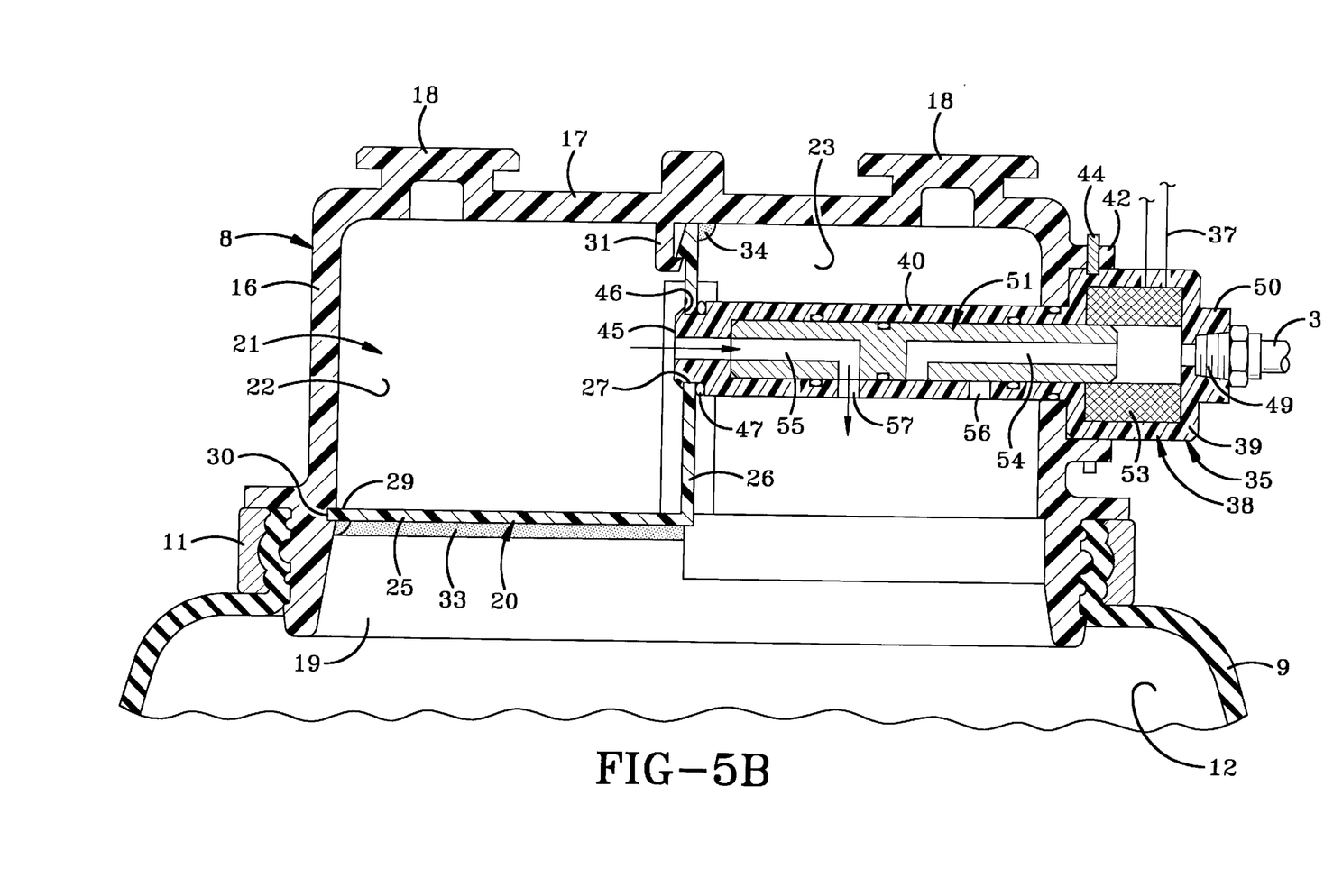
FIG. 5B is a view similar to FIGS. 5 and 5A showing the linearly movable plunger in a second open position providing communication between the auxiliary reservoir and the main air chamber.

In further accordance with the invention, a control valve indicated generally at 35, is mounted on end cap 8. A preferred control valve in an electric solenoid used for many air spring applications and is connected to a source of electricity by a pair of wires 37. Referring particularly to FIGS. 5–5B, solenoid valve 35 includes an outer housing indicated generally at 38, which includes an annular outer housing portion 39 and a reduced diameter tubular inner housing 40. Annular outer housing portion 39 can be seated within an annular boss 42 formed in outer wall 16 of end cap 8 by a snap ring 44. The inner end 45 of inner housing 40 is formed with an undercut edge 46 which extends through opening 27 of partition wall 26 and provides a snap-fit engagement therebetween to assist in retaining partition 20 in position within end cap 8. An O-ring 47 provides a sealing engagement with partition wall 26. A coupler 49 is mounted in a reduced end 50 of outer housing portion 39 for connecting fluid line 3 to the control valve.

A plunger 51 is slidably mounted within a hollow bore 52 of inner housing 40 and is moveable linearly therein in the usual manner by solenoid coil 53 which is electrically connected to the source of electricity by wires 37. Plunger 51 includes first and second L-shaped air passages 54 and 55 respectively, which selectively communicate and align with air ports 56 and 57 respectively, which are formed in inner housing 40.

The operation of the first embodiment of air spring 1 is shown in FIGS. 5, 5A and 5B. FIG. 5 shows a first open position wherein air can be supplied into or removed from main air chamber 12 since L-shaped passage 54 is aligned with air port 56 which provides fluid communication between compressor 2 and air chamber 12 with air port 57 being blocked by a solid portion of plunger 51. Thus, this plunger position provides the usual operation of the air spring where air is admitted into and out of main air chamber 12 by compressor 2 and by various venting valve arrangements (not shown) standard with such equipment, which movement of air is controlled by various sensors and onboard computers on the vehicle.

FIG. 5A shows plunger 51 in a fully closed position where both air ports 56 and 57 are blocked by solid portions of plunger 51. Thus, no air is admitted into or out of main air chamber 12 when plunger 51 is in this position nor is there any air movement into and out of hollow interior 21 of auxiliary reservoir 22.

FIG. 5B shows plunger 51 in a second open position wherein L-shaped passage 55 aligns with air port 57 permitting air to flow between auxiliary reservoir 22 and main air chamber 12. In this position, air port 57 is blocked by plunger 51 preventing movement of air between compressor 2 and air chamber 12. Thus, in the position as shown in FIG. 5B, the effective volume of the air spring is increased thereby providing for a softer ride characteristic than that achieved with a smaller air volume as shown in FIG. 5A. Thus, the linear movement of plunger 51 controlled by solenoid coil 53, will rapidly change the spring rate of air spring 1 by changing the effective interior volume of the air chamber for a softer ride or provide for a harder ride by movement of plunger 51 to the position of FIG. 5A or moving plunger 51 to the position of FIG. 5 wherein air can be introduced into and out of the main air chamber 12 by fluidly connecting it with compressor 2.

Figure 6:
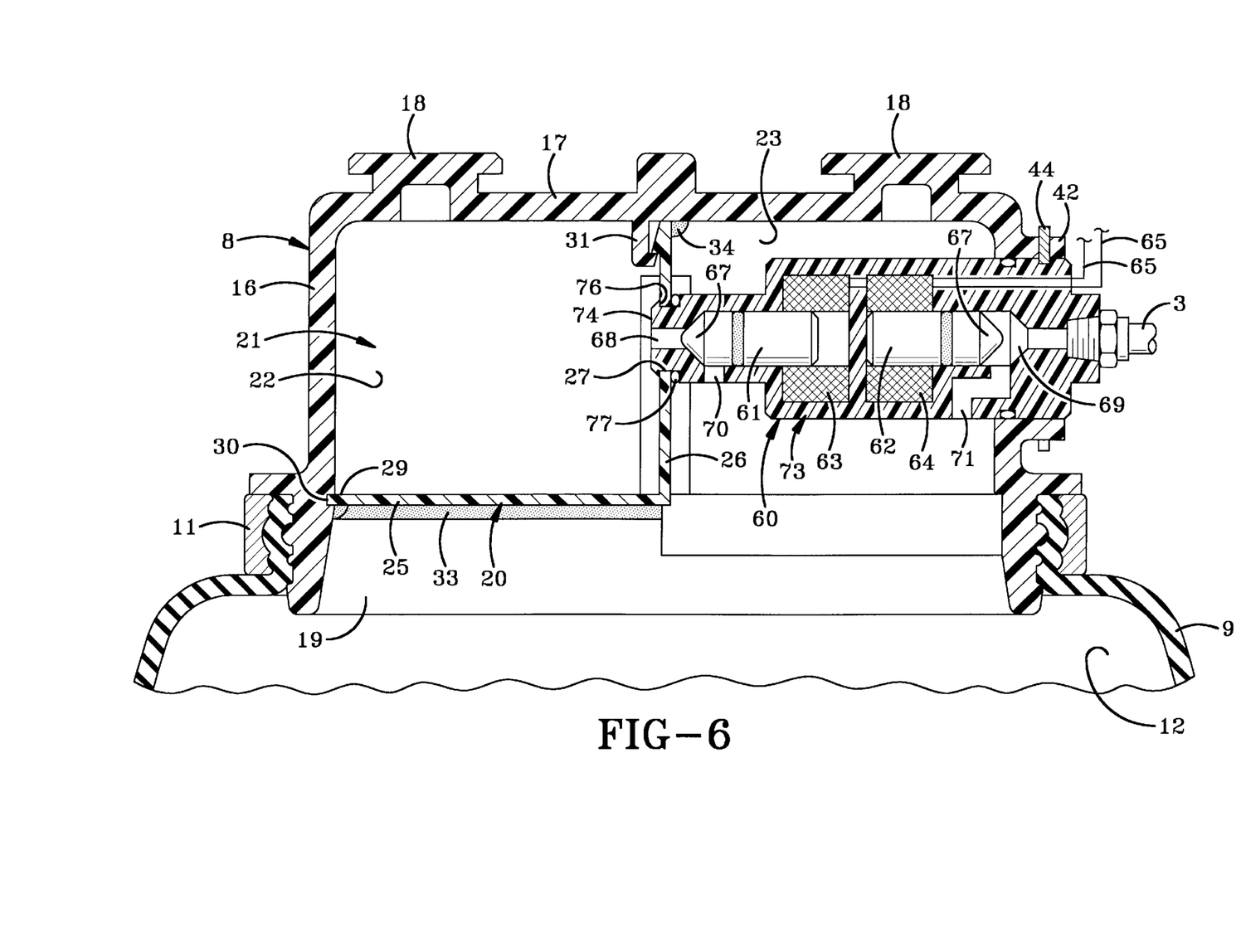
FIG. 6 is a fragmentary sectional view of the end cap with a modified control valve assembly containing two separate movable plungers for selectively providing communication between the auxiliary reservoir and the main air chamber and between the remote supply of compressed air and the main air chamber.

FIG. 6 shows a modified control valve, indicated generally at 60, which includes two separate independently movable plungers 61 and 62 and their activating coils 63 and 64 respectively. These coils are connected by wires 65 to an appropriate onboard computer or other control system for controlling the actuation of coils 63 and 64. Each plunger preferably will have a rounded bullet nose 67 which will selectively seal air passages 68 and 69 to permit or prevent movement of air from auxiliary reservoir 22 and main air chamber 12 through air passages 68 and 70 or through fluid supply line 3 and air passage 71, which air passages are formed in inner housing 73 of control valve 60. This embodiment provides for controlled fluid communication between air chamber 12 and auxiliary reservoir 22 and between air compressor 2 and air chamber 12. Plungers 61 and 62 can move together or individually to a closed position preventing any air movement between either of the air chambers and air compressor. Again, in accordance with one of the features of the invention, end 74 of inner housing 73 is provided with an undercut 76 and an O-ring 77 providing a snap-fit engagement in opening 27 of partition wall 26 to assist in securing partition 20 within end cap 8.

Figure 7:
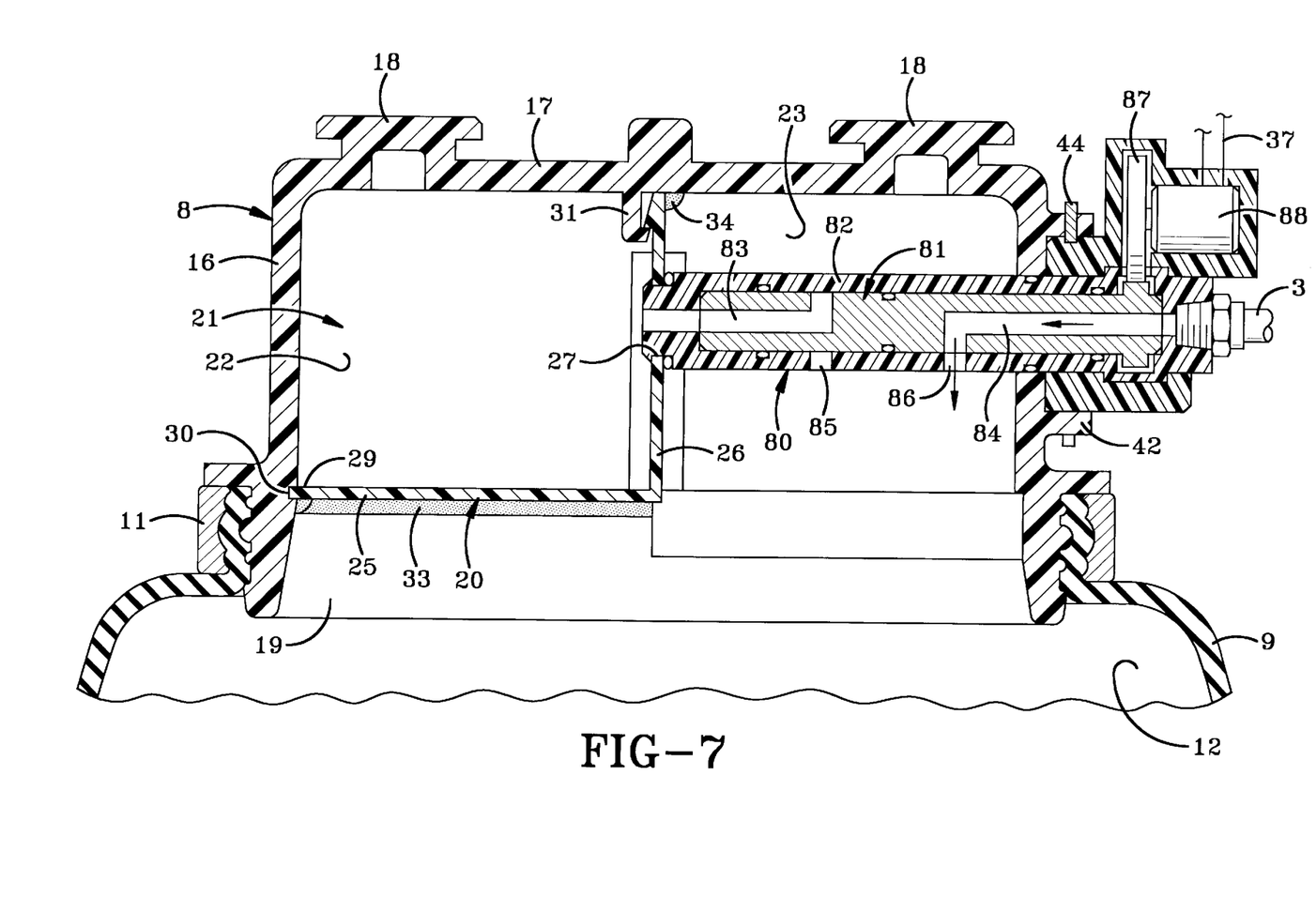
FIG. 7 is a fragmentary sectional view of the air spring end cap having a modified control valve containing a rotatable plunger mounted therein shown in a first open position providing communication between the source of pressurized air and the main air chamber.
Figure 7A:
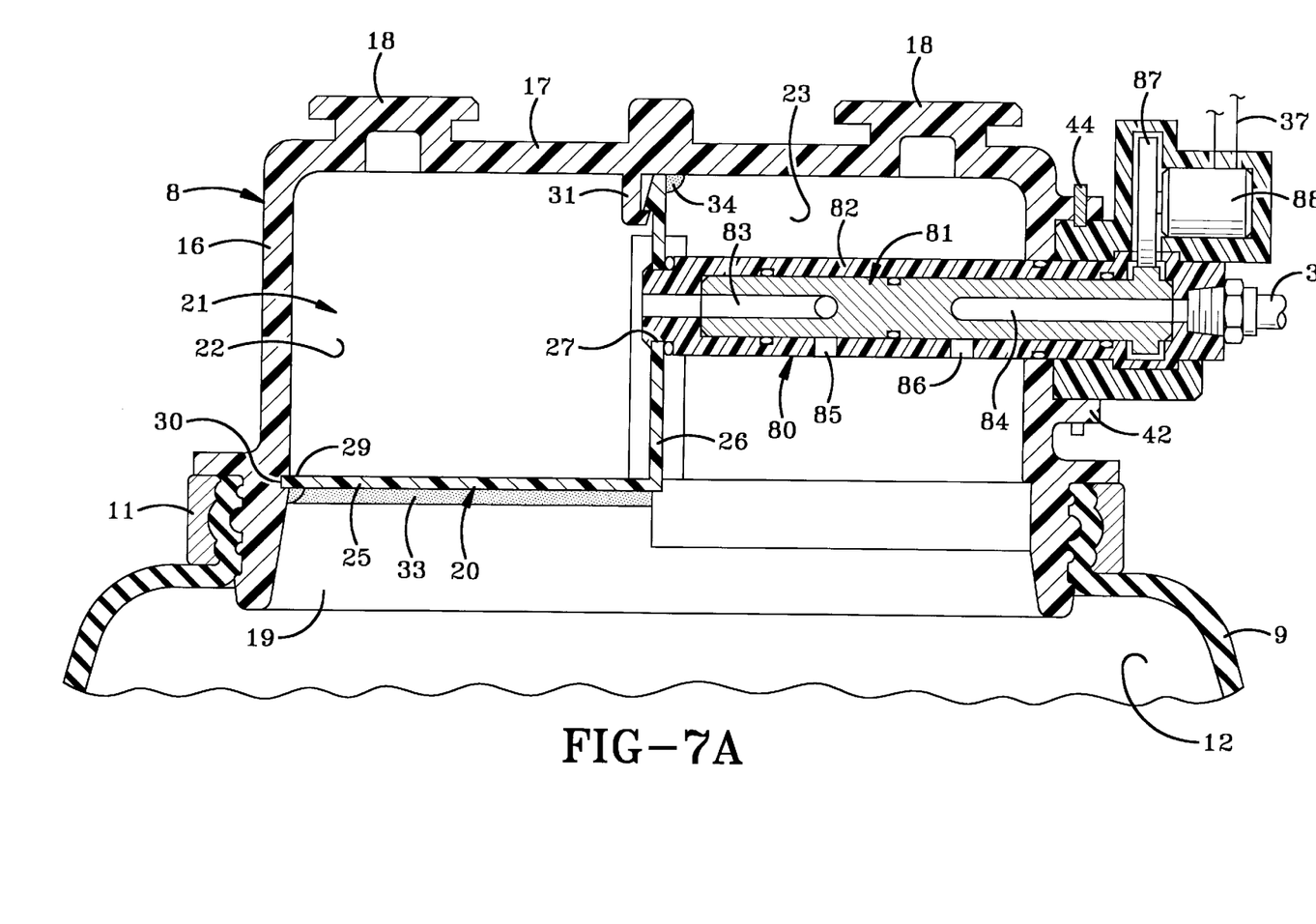
FIG. 7A is a view similar to FIG. 7 showing the rotatable plunger in a fully closed position.
Figure 7B:
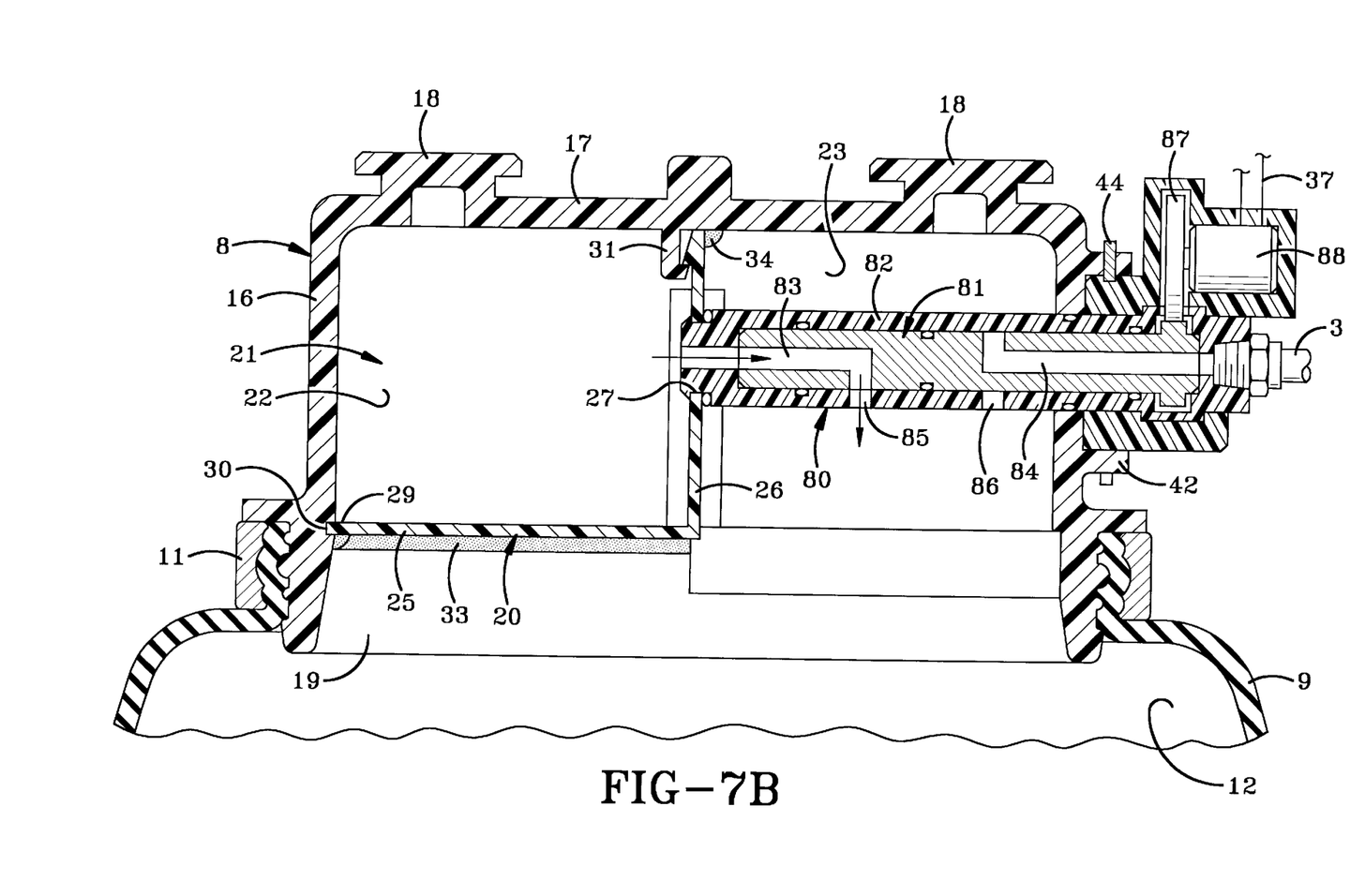
FIG. 7B is a view similar to FIGS. 7 and 7A showing the rotatable plunger in a second open position providing communication between the auxiliary reservoir and the main air chamber of the air spring.

A further modified control valve is indicated generally at 80 and is shown in FIGS. 7, 7A, and 7B and is similar in many respects to control valve 35. The main difference is that plunger 81 is rotatably mounted within inner housing 82 for selectively aligning L-shaped air passages 83 and 84 with air ports 85 and 86 respectively, for selectively providing fluid communication between auxiliary reservoir 22 and main air chamber 12 and between compressor 2 and air chamber 12. Plunger 81 can be rotated by a gear 87 and electric motor 88 or other type of control mechanism without effecting the concept of the invention. Thus, plunger 81 can be rotated to a fully closed position as shown in FIG. 7A or to a first open position as shown in FIG. 7 providing a fluid communication between compressor 2 and air chamber 12, or to a second open position as shown in FIG. 7B providing fluid communication between auxiliary reservoir 22 and air chamber 12.

Figure 8:
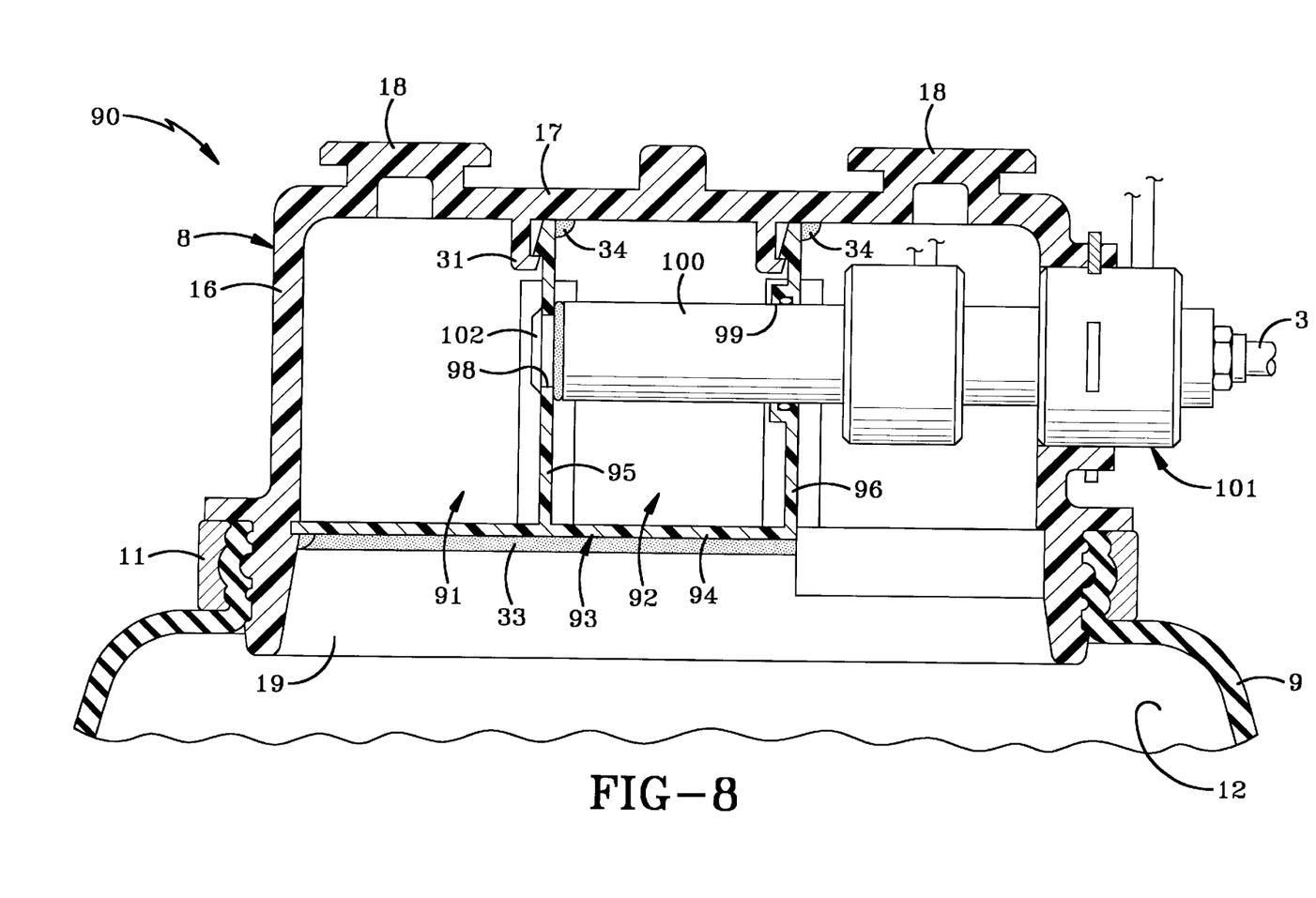
FIG. 8 is an enlarged sectional view of the air spring end cap having a pair of auxiliary air chambers formed therein and a control valve communicating therewith.
Figure 9:
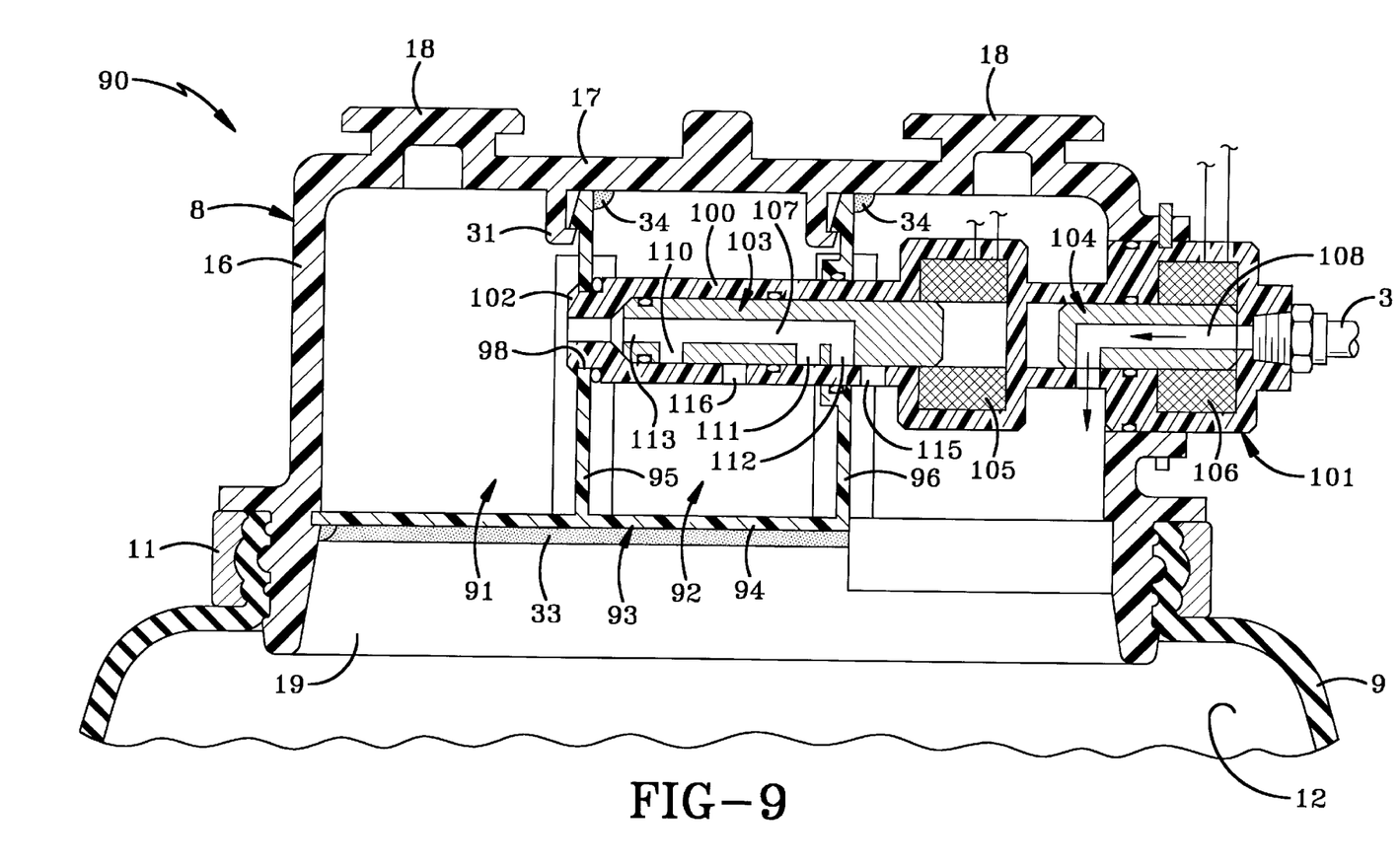
FIG. 9 is a sectional view of FIG. 8 showing the control valve having a pair of plungers, each controlled by a separate coil, with an inner plunger in a closed position and an outer plunger in an open position providing communication between the source of pressurized air and main air chamber.
Figure 9A:
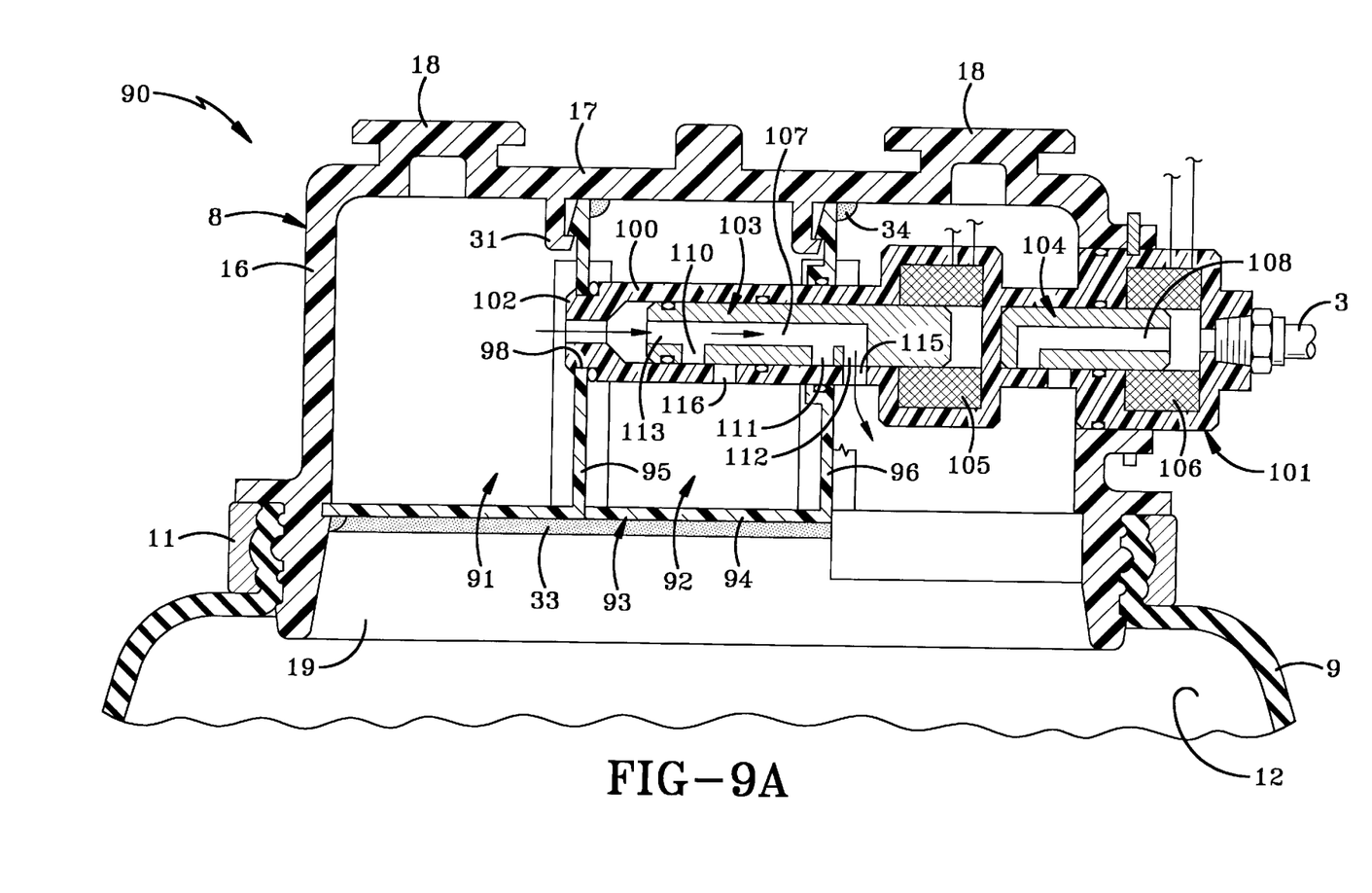
FIG. 9A is a view similar to FIG. 9 showing the inner plunger in an open position providing communication between the outer auxiliary reservoir and the main air chamber.
Figure 9B:
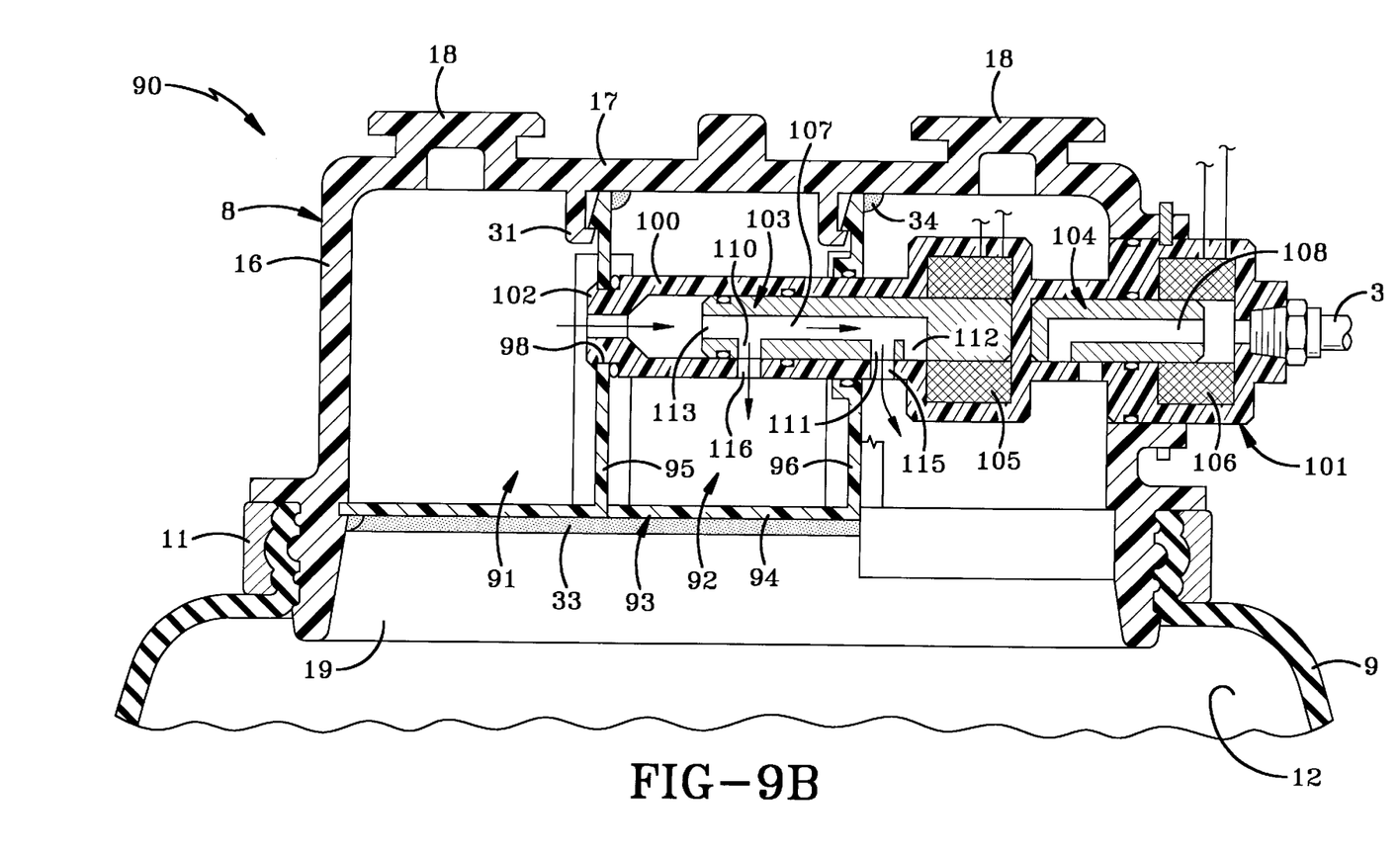
FIG. 9B is a view similar to 9A showing the inner plunger in an open position providing communication between both of the auxiliary reservoirs and the main air chamber.

A modified air spring is indicated generally at 90 and is shown in FIGS. 8–9B. Air spring 90 is similar in most respects to that of air spring 1 except that end cap 8 is formed with a pair of auxiliary reservoirs indicated generally at 91 and 92 by a partition 93. Parition 93 has a semi-circular bottom wall 94 and a pair of upstanding walls 95 and 96. Upstanding walls 95 and 96 are formed with openings 98 and 99 respectively, for slidably receiving therethrough a housing 100 of a control valve 101. Again, an outer end 102 of housing 100 forms a snap-fit engagement with upstanding wall 95 to help maintain partition 93 within end cap 8.

Referring to FIG. 9, control valve 101 includes inner tubular housing 100 which contains a pair of slidably mounted plungers 103 and 104, each being controlled by solenoid 105 and 106 respectively. Each plunger is formed with L-shaped air passages 107 and 108 for providing selective communication between compressor 2 and main air chamber 12. Air passage 107 is formed with an open end 113 and three radially extending legs 110, 111, and 112. As shown in FIG. 9, plunger 104 is shown in an open position providing fluid communication between compressor 2 and main air chamber 12 with plunger 103 being in a fully closed position preventing any flow of air between auxiliary reservoirs 91 and 92 and air chamber 12. FIG. 9A shows plunger 104 in a closed position preventing the flow of any air between compressor 2 and main chamber 12, with plunger 103 in a first open position providing fluid communication between the interior of auxiliary reservoir 91 and air chamber 12 by aligning air passage 112 with an opening 115 formed in housing 100. FIG. 9B shows plunger 103 in a position which provides fluid communication between the interiors of both auxiliary reservoirs 91 and 92 by aligning radial openings 110 and 111 with openings 116 and 115 respectively, formed in housing 100. This double reservoir configuration of air spring 90 provides even greater flexibility for varying the volume of the air spring to provide various desired spring rates. Thus, only one auxiliary reservoir can be connected with main air spring chamber 12 or both reservoirs to provide even increased volume to the air spring to change the spring rate. Again, plungers 103 and 104 can be rotatably mounted, if desired, and not linearly movable as shown in FIGS. 9–9B without affecting the concept of the invention.

Thus, the dual rate air spring of the present invention is self contained within the end cap of an air spring which can be easily modified by inserting a partition therein. Also the plunger housing assists in maintaining and securing the partition within the end cap avoiding the need for welding or bonding the partition in the end cap. This enables various types of materials such as glass reinforced resins to be utilized for the partition and/or end cap. After the partition is snap-fitted into position, it is sealed with a sealant which even should it leak, will not vent to the exterior of the air spring, but will vent into the main air spring chamber not causing serious problems to the operation of the air spring. Furthermore, usual types of magnetic coil actuated solenoid plungers are utilized which are connected to an onboard computer on the vehicle and to a compressor, thus enabling usual readily available vehicle components to be utilized. Likewise, the overall height of the air spring is not increased nor its particular mounting arrangement since all of the modifications occur within the interior of the end cap by snap-fitting a partition plate therein and utilizing a modified solenoid actuated plunger. Also, when the plunger is in a fully closed position it allows no air into the spring or into or from the auxiliary reservoir, and when activated, it will allow air to flow into the main air spring chamber to compensate for load or allow air to flow in and out of the reservoir to lower the air spring rate. The solenoids will have relief valves to let pressure out of the reservoir when not in use. This will keep a zero or negative relative pressure in the auxiliary reservoir and compress it into place. When the auxiliary reservoir is closed, the spring has a higher rate due to having less volume. Typical rates for such air springs when used for small trucks, sport utility, and sport cars would be 160 lb/in to 120 lb/in.

Also, if desired, the dual air spring can be combined with a piston damper without effecting the concept of the invention.

While the embodiments of the invention have been described, the invention is not limited thereto. The claims of the invention follow.

What is claimed is:

1. An adjustable rate air spring including:
   first and second spaced end members and a flexible sleeve extending therebetween forming an air chamber, said first end member being formed with a hollow interior which communicates with said air chamber;
   a partition located in the hollow interior of said first end member forming a first auxiliary reservoir therein; and
   an electrically operated solenoid control valve mounted on said first end member and connected to a supply of pressurized air, said valve containing a plunger mechanism extending into the hollow interior of said first end member for controlling the flow of pressurized air into the air chamber from the supply of pressurized air and for selectively permitting the flow of air between the auxiliary reservoir and the air chamber to change the effective volume of said air chamber thereby changing the spring rate of said air spring.

2. The air spring defined in claim 1 in which the first end member is an end cap and the second end member is a piston.

3. The air spring defined in claim 1 in which the plunger mechanism is formed with a pair of internal air passages, one of said passages provides communication between the supply of pressurized air and the air chamber, and the other of said air passages providing communication between the auxiliary reservoir and the air chamber.

4. The air spring defined in claim 1 in which the plunger mechanism includes a pair of plungers each independently moveable in a housing; in which one of said plungers provides fluid communication between the supply of pressurized air and the air chamber; and in which the other of said plungers provides fluid communication between the auxiliary reservoir and the air chamber.

5. The air spring as defined in claim 1 in which the control valve includes a housing; and in which the plunger mechanism includes a plunger which is slidably linearly movable within said housing.

6. The air spring as defined in claim 1 in which the control valve includes a housing; and in which the plunger mechanism includes a plunger which is rotatably mounted within said housing.

7. The air spring as defined in claim 1 in which the first end member and partition are formed of a high strength glass reinforced resin material.

8. The air spring as defined in claim 1 in which the partition and first end member include mating components providing a snap-fit engagement therebetween to mount said partition in said first end member.

9. The air spring as defined in claim 8 in which the plunger mechanism includes an outer housing which has a first portion attached to the first end member and a second portion attached to the partition to mount said partition in the hollow interior of said first end member.

10. The air spring as defined in claim 1 in which a second partition is located in the hollow interior of the first end member and forms a second auxiliary reservoir within said hollow interior.

11. The air spring as defined in claim 10 in which the control valve selectively provides a first air passage between the pressurized air and the air chamber, a second air passage between the first auxiliary reservoir and the air chamber, and a third air passage between said first and second auxiliary reservoirs.

12. The air spring as defined in claim 11 in which the plunger mechanism includes a pair of plungers and a pair of solenoids for independently moving each of said plungers; in which one of said plungers is formed with the first air passage; and in which the other of said plungers is formed with the second and third air passages.

13. The air spring defined in claim 1 in which the partition includes a semicircular base and an upstanding wall; in which an opening is formed in said upstanding wall; in which the control valve includes a housing having an extended end which extends into the upstanding wall opening; and in which an undercut is formed in the extended end of the housing and provides a snap-fit attachment with the upstanding wall.

14. The air spring defined in claim 1 in which the first end member includes an annular outer wall and a top wall which forms the hollow interior; and in which the control valve extends through an opening formed in said annular outer wall.

15. An adjustable rate air spring including:

first and second spaced end members and a flexible sleeve extending therebetween forming an air chamber, said first end member being an end cap and formed with a hollow interior which communicates with said air chamber, and said second member being a piston;

a partition located in the hollow interior of said first end member forming a first auxiliary reservoir therein; and a control valve mounted on said first end member and connected to a supply of pressurized air, said valve containing a plunger mechanism extending into the hollow interior of said first end member for controlling the flow of pressurized air into the air chamber from the supply of pressurized air and for selectively permitting the flow of air between the auxiliary reservoir and the air chamber to change the effective volume of said air chamber thereby changing the spring rate of said air spring, said plunger mechanism being formed with a pair of internal air passages, one of said passages provides communication between the supply of pressurized air and the air chamber, and the other of said air passages providing communication between the auxiliary reservoir and the air chamber.

16. The air spring defined in claim 15 in which the plunger mechanism includes solid portions which selectively block the flow of air between the auxiliary reservoir and the air chamber and between the supply of pressurized air and the air chamber.

17. An adjustable rate air spring including:

first and second spaced end members and a flexible sleeve extending therebetween forming an air chamber, said first end member being formed with a hollow interior which communicates with said air chamber;

a partition located in the hollow interior of said first end member forming a first auxiliary reservoir therein; and a control valve mounted on said first end member and connected to a supply of pressurized air, said valve containing a plunger mechanism extending into the hollow interior of said first end member for controlling the flow of pressurized air into the air chamber from the supply of pressurized air and for selectively permitting the flow of air between the auxiliary reservoir and the air chamber to change the effective volume of said air chamber thereby changing the spring rate of said air spring, said plunger mechanism including a pair of plungers each independently moveable in a housing, one of said plungers providing fluid communication between the supply of pressurized air and the air chamber the other of said plungers providing fluid communication between the auxiliary reservoir and the air chamber.

18. An adjustable rate air spring including:

first and second spaced end members and a flexible sleeve extending therebetween forming an air chamber, said first end member being formed with a hollow interior which communicates with said air chamber;

a partition located in the hollow interior of said first end member forming a first auxiliary reservoir therein; and a control valve mounted on said first end member and connected to a supply of pressurized air, said valve containing a plunger mechanism extending into the hollow interior of said first end member for controlling the flow of pressurized air into the air chamber from the supply of pressurized air and for selectively permitting the flow of air between the auxiliary reservoir and the air chamber to change the effective volume of said air chamber thereby changing the spring rate of said air spring, said control valve including a housing and the plunger mechanism including a plunger rotatably mounted within said housing.

19. The air spring defined in claim 18 in which a groove is formed in an inner surface of the first end member; and in which an edge of the base is received in said groove to mount the partition in said first end member.

20. An adjustable rate air spring including:

first and second spaced end members and a flexible sleeve extending therebetween forming an air chamber, said first end member being formed with a hollow interior which communicates with said air chamber;

a partition located in the hollow interior of said first end member forming a first auxiliary reservoir therein, said partition including a semicircular base and an upstanding wall and an opening formed in said upstanding wall; and a control valve mounted on said first end member and connected to a supply of pressurized air, said valve containing a plunger mechanism extending into the hollow interior of said first end member for controlling the flow of pressurized air into the air chamber from the supply of pressurized air and for selectively permitting the flow of air between the auxiliary reservoir and the air chamber to change the effective volume of said air chamber thereby changing the spring rate of said air spring, said control valve includes a housing having an extended end which extends into the upstanding wall opening of the partition, and an undercut formed in the extended end of the housing and providing a snap-fit attachment with the upstanding wall.

21. The air spring defined in claim 20 in which a sealant extends between the base and the first end member to provide an air seal therebetween.

22. The air spring defined in claim 20 in which the upstanding wall is formed with an angled edge which forms a snap-fit engagement with a complementary shaped rib formed on the first end member.

23. An adjustable rate air spring including:

first and second spaced end members and a flexible sleeve extending therebetween forming an air chamber, said first end member having an annular outer wall and a top wall which forms a hollow interior which communicates with said air chamber;

a partition located in the hollow interior of said first end member forming a first auxiliary reservoir therein; and a control valve mounted on and extending through an opening found in the annular outer wall of said first end member and connected to a supply of pressurized air, said valve containing a plunger mechanism extending into the hollow interior of said first end member for controlling the flow of pressurized air into and out of the air chamber and for selectively permitting the flow of air between the auxiliary reservoir and the air chamber to change the effective volume of said air chamber thereby changing the spring rate of said air spring.

24. The air spring defined in claim 23 in which the control valve includes a first housing portion located exteriorly of the annular outer wall of the first end member and a second portion extending into the hollow interior of said first end member and secured to the partition.

* * * * *